(12) United States Patent
Mestanov et al.

(10) Patent No.: US 9,775,019 B2
(45) Date of Patent: Sep. 26, 2017

(54) CARRIER AGGREGATION IN AN INTEGRATED WIRELESS COMMUNICATIONS NETWORK HAVING A WLAN AND A CELLULAR COMMUNICATIONS NETWORK

(71) Applicant: Telefonaktiebolaget LM Ericsson (publ), Stockholm (SE)

(72) Inventors: Filip Mestanov, Sollentuna (SE); Niklas Johansson, Sollentuna (SE); Christofer Eric Lindheimer, Linköping (SE); Magnus Stattin, Sollentuna (SE); Mattias Tan Bergström, Stockholm (SE); Oumer Teyeb, Solna (SE); Jari Vikberg, Järna (SE)

(73) Assignee: Telefonaktiebolaget LM Ericsson (Publ), Stocholm (SE)

( * ) Notice: Subject to any disclaimer, the term of this patent is extended or adjusted under 35 U.S.C. 154(b) by 90 days.

(21) Appl. No.: 14/428,873

(22) PCT Filed: Oct. 27, 2014

(86) PCT No.: PCT/SE2014/051262
§ 371 (c)(1),
(2) Date: Mar. 17, 2015

(87) PCT Pub. No.: WO2016/068759
PCT Pub. Date: May 6, 2016

(65) Prior Publication Data
US 2016/0255488 A1 Sep. 1, 2016

(51) Int. Cl.
*H04L 12/28* (2006.01)
*H04W 8/00* (2009.01)
(Continued)

(52) U.S. Cl.
CPC ............. *H04W 8/005* (2013.01); *H04L 67/24* (2013.01); *H04W 48/14* (2013.01);
(Continued)

(58) Field of Classification Search
CPC ..... H04W 8/005; H04W 48/14; H04W 48/12; H04W 48/06; H04W 92/02
See application file for complete search history.

(56) References Cited

U.S. PATENT DOCUMENTS

2011/0064080 A1 3/2011 Hsu et al.
2012/0281609 A1* 11/2012 Kasslin ................. H04W 48/14
370/312
(Continued)

FOREIGN PATENT DOCUMENTS

EP 2 704 481 A1 5/2012
WO 2013138711 A1 9/2013
(Continued)

OTHER PUBLICATIONS

International Search Report and Written Opinion dated Jul. 6, 2015 for International Application Serial No. PCT/SE2014/051262, International Filing Date—Oct. 27, 2014 consisting of 9-pages.
(Continued)

*Primary Examiner* — Abdelnabi O Musa
(74) *Attorney, Agent, or Firm* — Christopher & Weisberg, P.A.

(57) ABSTRACT

A Wireless Local Area Network, WLAN, node, and a method therein, for handling of an integrated wireless communications network, wherein the WLAN node and a wireless device are operating in the integrated wireless communications network. The integrated wireless communications network comprises a WLAN and a cellular communications network. The method comprises transmitting, to the wireless device, a first indication configured to indicate, to the wireless device, the aggregation capability of the WLAN node.

48 Claims, 9 Drawing Sheets

(51) Int. Cl.
*H04W 76/02* (2009.01)
*H04L 29/08* (2006.01)
*H04W 48/14* (2009.01)
H04W 28/08 (2009.01)
H04W 48/12 (2009.01)
H04W 60/00 (2009.01)
H04W 84/12 (2009.01)
H04W 88/06 (2009.01)
H04W 92/02 (2009.01)

(52) U.S. Cl.
CPC .......... *H04W 76/026* (2013.01); *H04W 28/08* (2013.01); *H04W 48/12* (2013.01); *H04W 60/005* (2013.01); *H04W 84/12* (2013.01); *H04W 88/06* (2013.01); *H04W 92/02* (2013.01)

(56) References Cited

U.S. PATENT DOCUMENTS

| | | | |
|---|---|---|---|
| 2013/0231151 A1* | 9/2013 | Kneckt | H04W 40/246 455/515 |
| 2013/0242783 A1 | 9/2013 | Horn et al. | |
| 2013/0242897 A1* | 9/2013 | Meylan | H04W 28/16 370/329 |
| 2013/0294354 A1* | 11/2013 | Zhang | H04W 72/04 370/329 |
| 2014/0079016 A1* | 3/2014 | Dai | H04L 5/0041 370/330 |
| 2014/0204927 A1 | 7/2014 | Horn et al. | |

FOREIGN PATENT DOCUMENTS

| | | |
|---|---|---|
| WO | 2013176588 A1 | 11/2013 |
| WO | 2013186024 A1 | 12/2013 |
| WO | 2014066536 A1 | 5/2014 |
| WO | 2014074705 A1 | 5/2014 |

OTHER PUBLICATIONS

Dilip Krishnaswamy et al.: "COBA: Concurrent Bandwidth Aggregation—A Case Study in Parallel Wireless Communications", Journal of Communications, vol. 7(7):1 XP055197680, ISSN: 1796-2021, DOI: 10.4304/jcm.7.7. Jul. 2012 (Jul. 1, 2012), pp. 524-537 total of 14-pages.

* cited by examiner

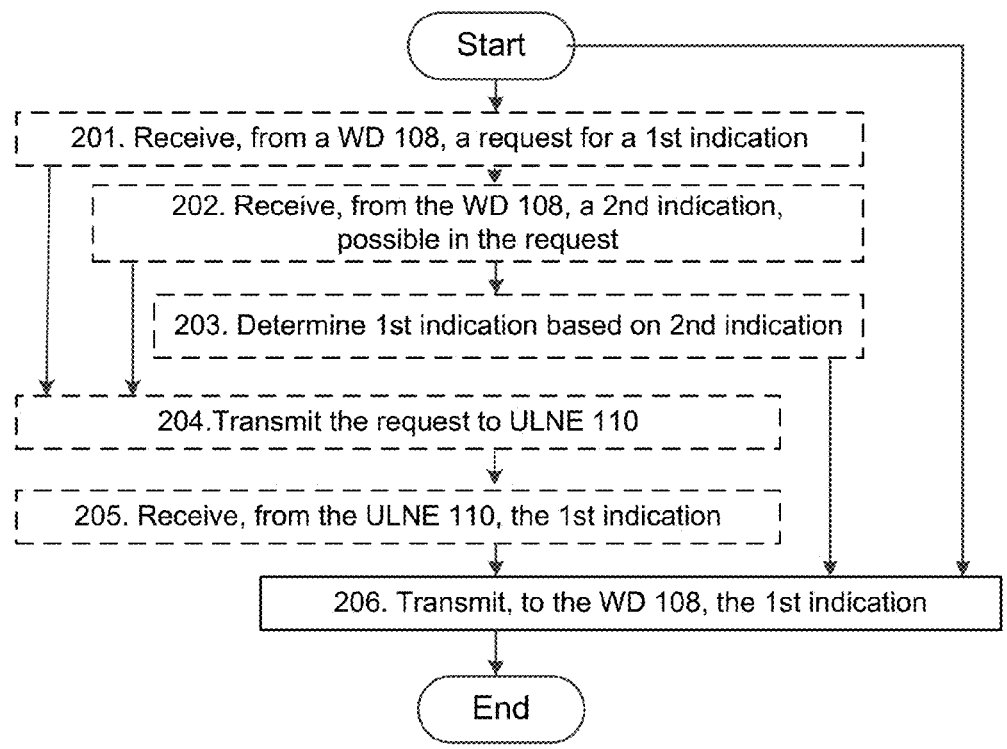
Fig. 2 Method in a WLAN Node 106
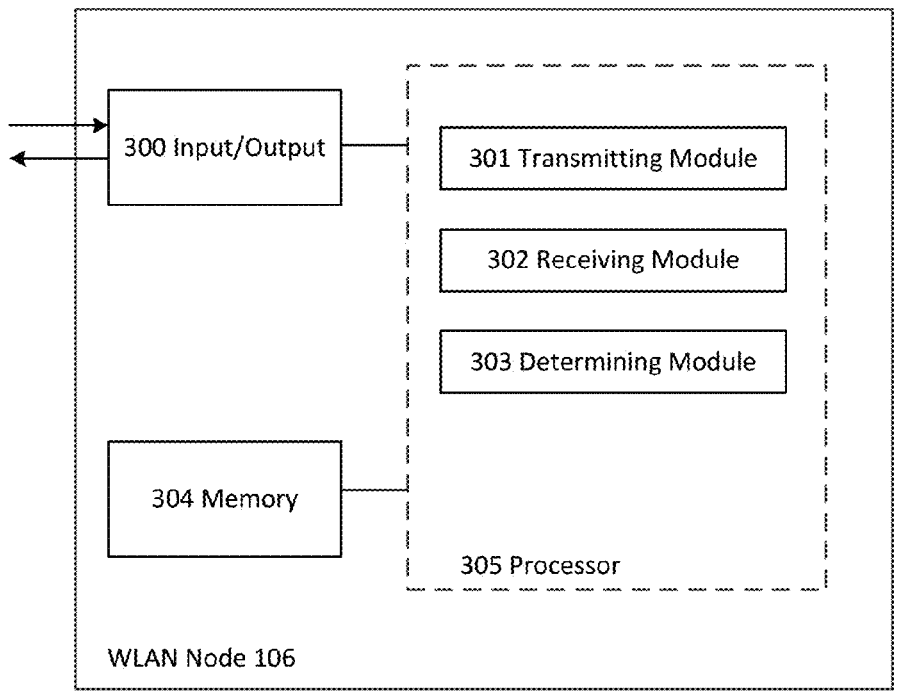
Fig. 3

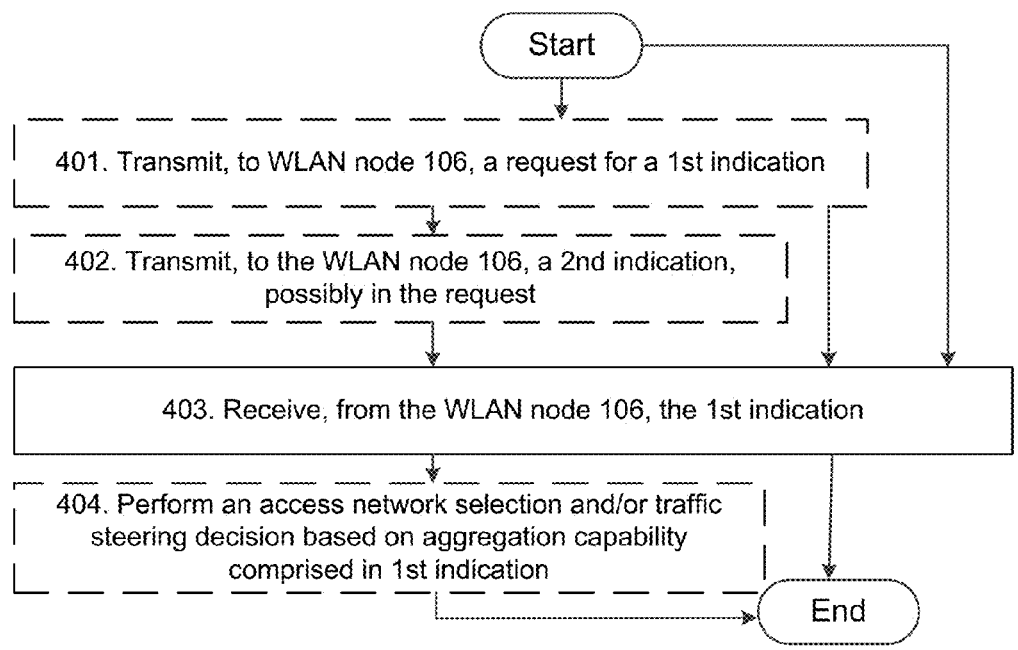
Fig. 4 Method in a wireless device 108
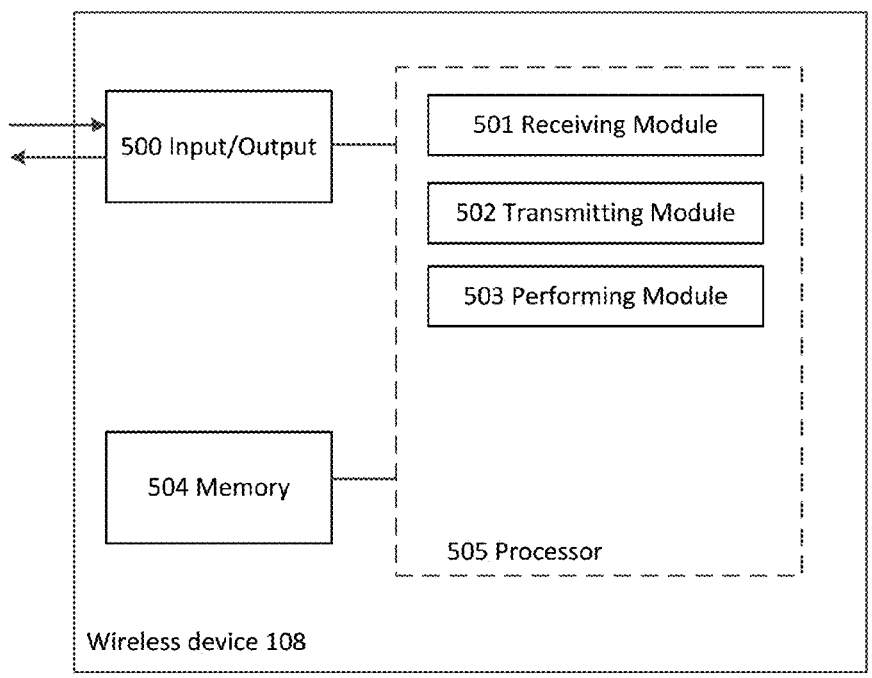
Fig. 5

Fig. 6 NACI in Beacon and Probe Response

Fig. 7 NACI in Probe Response,
requested by WD via probe Request

Fig. 8 NACI over ANQP

Fig. 9 NACI via Upper Layer Proxy (ULP) exchange

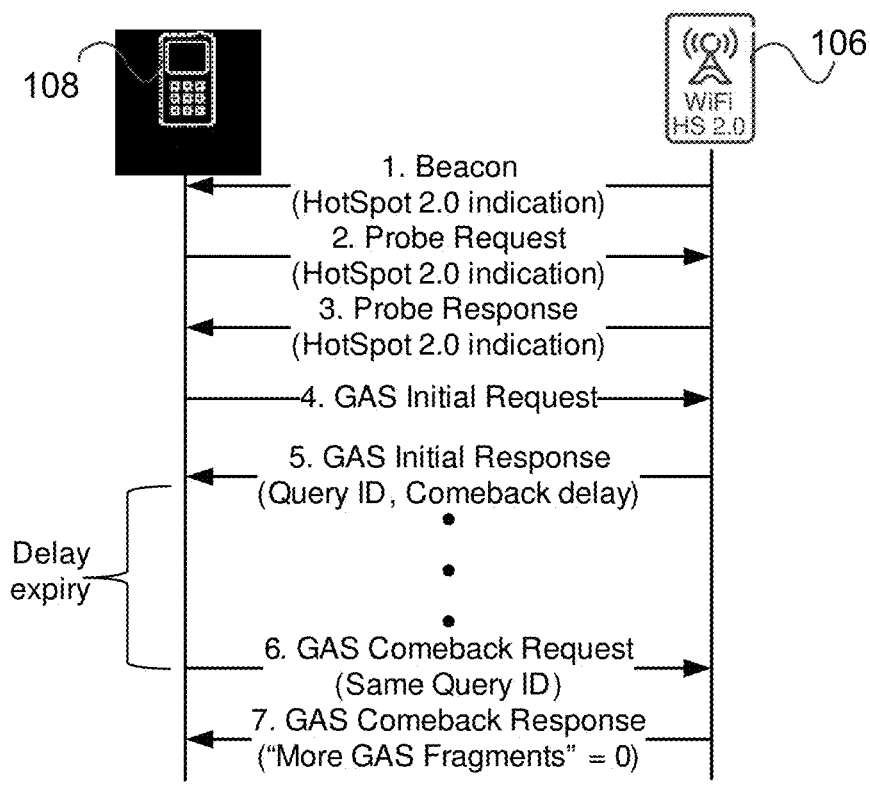
Fig. 11 Pre-association Discovery

CARRIER AGGREGATION IN AN INTEGRATED WIRELESS COMMUNICATIONS NETWORK HAVING A WLAN AND A CELLULAR COMMUNICATIONS NETWORK

TECHNICAL FIELD

Embodiments herein relate generally to a Wireless Area Network (WLAN) node, a wireless device and to methods therein. In particular they relate to handling of an integrated wireless communications network.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

3GPP/WLAN Interworking

Most current WLAN deployments are totally separate from cellular networks, and may be seen as non-integrated from a UE perspective. In this document, the terms "WLAN" and "Wi-Fi" will be used interchangeably. Most Operating Systems (OSs) for UEs, such as Android™ and ioS®, support a simple Wi-Fi offloading mechanism where a UE immediately switches all its IP traffic to a Wi-Fi network upon a detection of a suitable Wi-Fi network with a received signal strength above a certain level, e.g. above a certain threshold. Henceforth, the decision to offload to a Wi-Fi or not is referred to as access selection strategy and the term "Wi-Fi-if-coverage" is used to refer to the aforementioned strategy of selecting Wi-Fi whenever such a network is detected.

There are several drawbacks of the "Wi-Fi-if-coverage" strategy.

Though the user, such as a UE, may save previous pass codes for already accessed Wi-Fi Access Points (APs), hotspot login for previously non-accessed APs usually requires user intervention, either by entering the pass code in Wi-Fi Connection Manager (CM) or using a web interface. The connection manager is a piece of software on a UE that is in charge of managing network connections of the UE, taking into account user preferences, operator preferences, network conditions, etc.

A first drawback of the Wi-Fi-if-coverage strategy is that no consideration of expected user experience is made, except those considered in the UE implemented proprietary solution. This may lead to the UE being handed over from a high data rate cellular network connection to a low data rate Wi-Fi connection. Even though the UE's OS or some high level software is smart enough to make the offload decisions only when the signal level on the Wi-Fi is considerably better than the cellular network link, there may still be limitations on the backhaul of the Wi-Fi Access Point (AP) that may end up being the bottleneck.

A second drawback of the Wi-Fi-if-coverage strategy is that no consideration of the load conditions in the cellular network and the Wi-Fi network is made. As such, the UE may be offloaded to a Wi-Fi AP that is serving several UEs while the cellular network, e.g. LTE, to which the UE previously was connected to is rather unloaded.

A third drawback of the Wi-Fi-if-coverage strategy is that interruptions of on-going services may occur due to the change of IP address when the UE switches to the Wi-Fi network. For example, a user who started a Voice over IP (VoIP) call while connected to a cellular network is likely to experience a call drop when arriving home and the UE automatically switches to the Wi-Fi network. Though some applications, e.g. Spotify®, are smart enough to handle this and survive the IP address change, the majority of current applications do not. This places a lot of burden on application developers if they have to ensure service continuity.

A fourth drawback of the Wi-Fi-if-coverage strategy is that no consideration of the UE's mobility is made. Due to this, a fast moving UE may end up being offloaded to a Wi-Fi AP for a short duration, just to be handed over back to the cellular network. This is specially a problem in scenarios like cafes with open Wi-Fi, where a user walking by or even driving by the cafe might be affected by this. Such ping pong between the Wi-Fi network and the cellular network may cause service interruptions as well as generate considerable unnecessary signalling, e.g. towards authentication servers.

Recently, Wi-Fi networks have been subject to increased interest from cellular network operators, not only as an extension to fixed broadband access. The interest is mainly about using the Wi-Fi technology as an extension, or alternative to cellular radio access network technologies to handle the always increasing wireless bandwidth demands. Cellular operators that are currently serving mobile users with, e.g., any of the 3GPP technologies, LTE, UMTS/WCDMA, or GSM, see Wi-Fi as a wireless technology that may provide good support in their regular cellular networks. The term "operator-controlled Wi-Fi" points to a Wi-Fi deployment that on some level is integrated with a cellular network operators existing cellular network and where the 3GPP radio access networks and the Wi-Fi wireless access may even be connected to the same core network and provide the same services.

There is currently quite intense activity in the area of operator-controlled Wi-Fi in several standardization organizations. In 3GPP, activities to connect Wi-Fi access points to the 3GPP-specified core network is pursued, and in Wi-Fi alliance, WFA, activities related to certification of Wi-Fi products are undertaken, which to some extent also is driven from the need to make Wi-Fi a viable wireless technology for cellular operators to support high bandwidth offerings in their networks. The term Wi-Fi offload is commonly used and points towards that cellular network operators seek means to offload traffic from their cellular networks to Wi-Fi, e.g., in peak-traffic-hours and in situations when the cellular network for one reason or another needs to be off-loaded, e.g., to provide requested quality of service, maximize bandwidth or simply for coverage.

RAN Level Integration

3GPP is currently working on specifying a feature and a mechanism for WLAN/3GPP Radio interworking which improves operator control with regard to how a UE performs access selection and/or traffic steering between 3GPP and WLANs belonging to the operator or its partners. It may even be so that the mechanism may be used for other, non-operator, WLANs as well, even though this is not the main target.

It is discussed that for this mechanism the RAN provides assistance parameters that helps the UE in the access selection and/or traffic steering. The RAN assistance information is composed of three main components, namely threshold values, Offloading Preference Indicator (OPI) and WLAN identifiers. The UE also has rules and/or policies that make use of these assistance parameters.

The thresholds values may be for example for metrics such as 3GPP signal related metrics: Reference Signal Received Power (RSRP), Reference Signal Received Quality (RSRQ), Received Signal Code Power (RSCP), Energy per chip over the Noise (EcNo), and/or WLAN signal related metrics such as Received Channel Power Indicator (RCPI), Received Signal to Noise Indicator (RSNI), Received Signal Strength Indicator (RSSI), WLAN load/utilization, WLAN backhaul load/capacity, etc. One example of a RAN rule that uses the threshold value may be that the UE should connect to a WLAN if the RSRP is below the signalled RSRP threshold at the same time as the WLAN RCPI is above the signalled RCPI threshold. It is also discussed that the RAN should provide thresholds for when the UE should steer traffic back from WLAN to 3GPP. The RAN rules and/or policies are expected to be specified in a 3GPP specification such as TS 25.304 v12.1.0/TS 36.304 v12.0.0 and/or TS 25.331 v12.1.0/TS 36.331 v12.1.0.

With the above mechanism it is likely not wanted, or maybe not even feasible, that the UE considers any WLAN when deciding where to steer traffic. For example, it may not be feasible that the UE uses this mechanism to decide to steer traffic to a WLAN not belonging to the operator. Hence it has been proposed that the RAN should also indicate to the UE which WLANs the mechanism should be applied for by sending WLAN identifiers.

The RAN may also provide additional parameters which are used in Access Network Discovery and Selection Function (ANDSF) policies. ANDSF is an entity within an Evolved Packet Core (EPC) of a System Architecture Evolution (SAE) for 3GPP compliant mobile networks. The purpose of the ANDSF is to assist a UE to discover non-3GPP access networks, such as Wi-Fi or WIMAX, which may be used for data communications in addition to 3GPP access networks, such as High Speed Packet Access (HSPA) or LTE, and to provide the UE with rules policing the connection to these networks. One proposed parameter is Offloading Preference Indicator (OPI). One possibility for OPI is that it is compared to a threshold in the ANDSF policy to trigger different actions, another possibility is that OPI is used as a pointer to point, and select, different parts of the ANDSF policy which would then be used by the UE.

The RAN assistance parameters, i.e. thresholds, WLAN identifiers, OPI, provided by RAN may be provided with dedicated signalling and/or broadcast signalling. Dedicated parameters may only be sent to the UE when having a valid RRC connection to the 3GPP RAN. A UE which has received dedicated parameters applies dedicated parameters; otherwise the UE applies the broadcast parameters. If no RRC connection is established between the UE and the RAN, the UE may not receive dedicated parameters.

In 3GPP, it has been agreed that ANDSF should be enhanced for 3GPP Release-12 to use the thresholds and OPI parameters that are communicated to the RAN, and that if enhanced ANDSF policies are provided to the UE, the UE will use the ANDSF policies instead of the RAN rules and/or policies, i.e. the ANDSF has precedence.

SUMMARY

As the state of the art WLAN nodes do not support aggregation, currently there is no way to provide information regarding an aggregation capability of the WLAN node. Therefore, an object of embodiments herein is to provide a way of improving the performance in an integrated wireless communications network, wherein the aggregation capability of a WLAN node may be communicated and taken into consideration.

According to a first aspect of embodiments herein, the object is achieved by a method in a Wireless Local Area Network, WLAN, node for handling of an integrated wireless communications network.

The WLAN node and a wireless device are operating in the integrated wireless communications network, which integrated wireless communications network comprises a WLAN and a cellular communications network.

The WLAN node transmits, to the wireless device, a first indication configured to indicate, to the wireless device, the aggregation capability of the WLAN node.

According to a second aspect of embodiments herein, the object is achieved by a Wireless Local Area Network, WLAN, node for handling of an integrated wireless communications network.

The WLAN node and a wireless device are operating in the integrated wireless communications network, which integrated wireless communications network comprises a WLAN and a cellular communications network.

The WLAN node is configured to transmit, to the wireless device, a first indication configured to indicate, to the wireless device, the aggregation capability of the WLAN node.

According to a third aspect of embodiments herein, the object is achieved by a method in a wireless device for handling of an integrated wireless communications network.

A WLAN node and the wireless device are operating in the integrated wireless communications network, which integrated wireless communications network comprises a WLAN and a cellular communications network.

The wireless device receives, from the WLAN node, a first indication configured to indicate, to the wireless device, the aggregation capability of the WLAN node.

According to a fourth aspect of embodiments herein, the object is achieved by a wireless device for handling of an integrated wireless communications network.

A WLAN node and the wireless device are operating in the integrated wireless communications network, which integrated wireless communications network comprises a WLAN and a cellular communications network.

The wireless device is configured to receive, from the WLAN node, a first indication configured to indicate, to the wireless device, the aggregation capability of the WLAN node.

According to a fifth aspect of embodiments herein, the object is achieved by a computer program, comprising instructions which, when executed on at least one processor, causes the at least one processor to carry out the method in the WLAN node.

According to a sixth aspect of embodiments herein, the object is achieved by a computer program, comprising instructions which, when executed on at least one processor, causes the at least one processor to carry out the method in the wireless device.

According to a seventh aspect of embodiments herein, the object is achieved by a carrier comprising the computer program, wherein the carrier is one of an electronic signal, optical signal, radio signal or computer readable storage medium.

Since the WLAN node transmits to the wireless device, the first indication configured to indicate to the wireless device, the aggregation capability of the WLAN node, the wireless device may use the aggregation capability for proper access network selection and traffic steering, whereby access network selection and traffic steering is enhanced. This results in an improved performance in the integrated wireless communications network.

BRIEF DESCRIPTION OF DRAWINGS

Examples of embodiments herein are described in more detail with reference to attached drawings in which:

FIG. 2 is a flowchart depicting embodiments of a method in a WLAN node;

FIG. 3 is a schematic block diagram illustrating embodiments of a WLAN node;

FIG. 4 is a flowchart depicting embodiments of a method in a wireless device;

FIG. 5 is a schematic block diagram illustrating embodiments of a wireless device;

FIG. 11 is a sequence diagram illustrating a method in embodiments of an integrated wireless communications network.

DETAILED DESCRIPTION

Embodiments herein comprises a method for a WLAN node to indicate, to a wireless device, whether or not it supports aggregation and if so, what kind of aggregation it supports. This may be indicated either via broadcast or unicast signalling. Embodiments herein also relate to a wireless device implementing mechanisms for network aggregation that may make use of this information for proper access network selection and traffic steering.

By the term "aggregation" when used herein is meant that packets, such as data packets, belonging to a certain traffic flow, e.g. an IP flow belonging to a certain service and/or application, may be transmitted in one or more of a number of aggregated paths. The number of aggregated paths may comprise a number of paths belonging to the same or different communications networks, such as to a WLAN and/or a cellular communications network, comprised in an integrated wireless communications network.

The packets may be transmitted in the one or more of the number of aggregated paths depending on some packet scheduling decision. For example, a simple round robin packet scheduler realization may be to transmit a first packet of a certain traffic flow, which traffic has been decided to be aggregated, on a first path, and a second packet of the certain traffic flow on a second path. Further, a third packet of the certain traffic flow may be transmitted on the first path, a fourth packet of the certain traffic flow may be transmitted on the second path, etc. The first and second paths may be paths comprised a WLAN and/or a cellular communications network.

It should be understood that the aggregation between the WLAN and the cellular communications network, such as a 3GPP network, referred to herein is different from the carrier aggregation capability in 3GPP. For example, a UE that doesn't support 3GPP carrier aggregation may still support the aggregation between the WLAN and the cellular communications network, e.g. the 3GPP network, as described herein. The aggregation between the WLAN and the 3GPP network may for example be performed at the Packet Data Convergence Protocol (PDCP) level.

Below, embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 1:
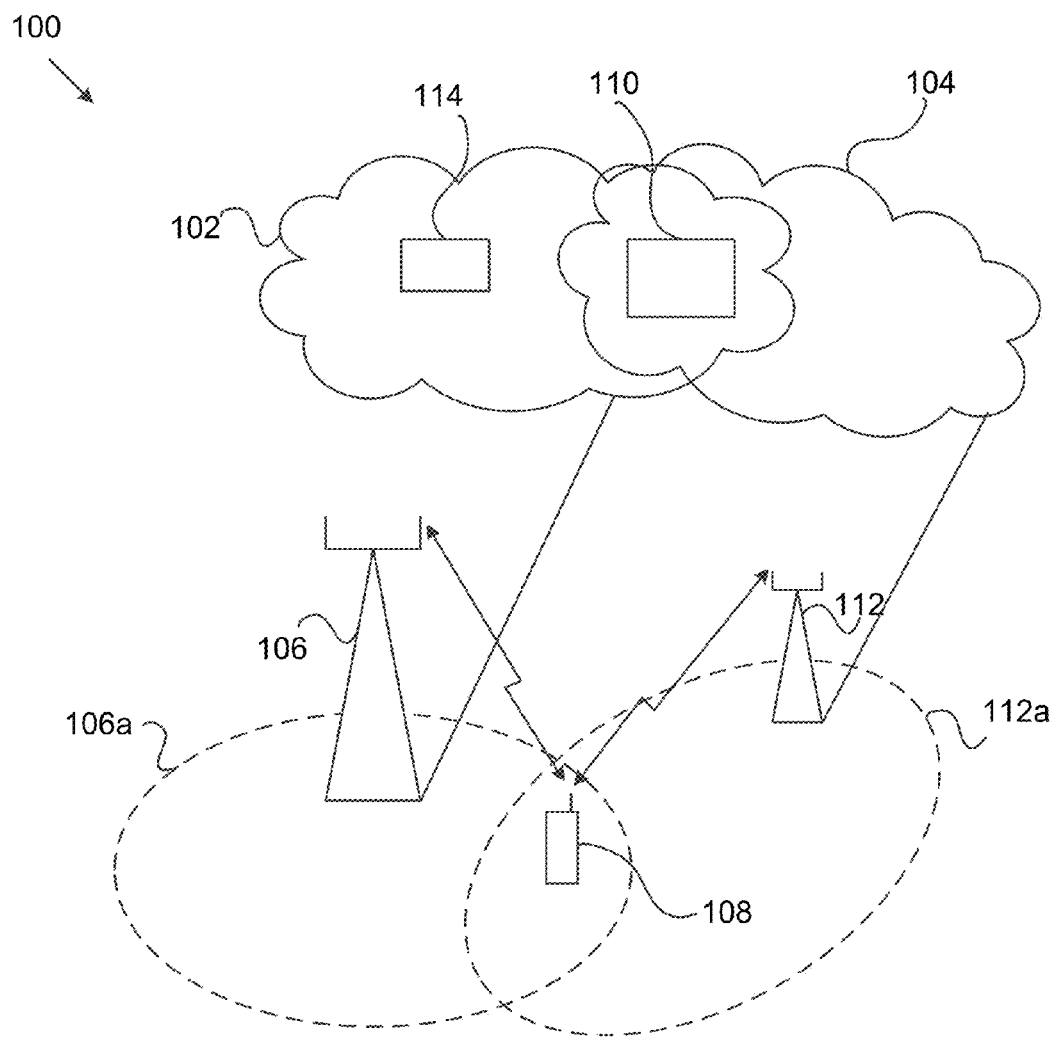
FIG. 1 schematically illustrates an embodiment of an integrated wireless communications network.

As schematically illustrated in FIG. 1 embodiments herein relate to an integrated wireless communications network 100. The integrated wireless communications network 100 may comprise a Wireless Local Area Network (WLAN) 102 and a cellular communications network 104.

The WLAN 102 may be any wireless computer network that links two or more devices using a wireless distribution method within a limited area such as a home, school, shopping mall, coffee shop, computer laboratory, or office building. The wireless distribution method may be a spread-spectrum method or an Orthogonal Frequency-Division Multiplexing (OFDM) radio method. The WLAN may be implemented according to e.g. IEEE 802.11. The IEEE 802.11 comprises a set of Media Access Control (MAC) and PHYsical layer (PHY) specifications for implementing WLAN computer communication in the 2.4, 3.6, 5 and 60 GHz frequency bands.

The cellular communications network 104 may be an LTE network, a WCDMA network, an GSM network, any 3GPP cellular network, Wimax, or any other cellular network or system.

A WLAN node 106 operates in the WLAN 102. The WLAN node 106 may be a wireless Access Point (AP). Sometimes herein, the terms "WLAN node" and "AP" are used interchangeably. The WLAN node 102 is a device that allows wireless devices to connect to a wired network using Wi-Fi, or related standards. The WLAN node 102 may connect to a router (not shown) via a wired network but it may also be an integral component of the router itself.

Further, the WLAN node 106 is configured to communicate with a wireless device 108, when the wireless device 108 supports communication with the WLAN node 106 and when the wireless device 108 is within a coverage area 106a of the WLAN node 106.

The wireless device 108, herein also referred to as a user equipment or UE, operates in the integrated wireless communications network 100. The wireless device 108 may e.g. be a user equipment, a mobile terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in the integrated wireless communications network 100. Please note the term user equipment used in this document also covers other wireless devices such as Machine to Machine (M2M) devices, even though they do not have any user.

An Upper Layer Network Entity (ULNE) 110 may also be comprised in the integrated wireless communications network 100. Herein, the upper layer network entity 110 is sometimes referred to as an Upper Layer Proxy (ULP). In some embodiments, the ULNE 110 is a service-discovery proxy.

The ULNE 110 may be comprised in the WLAN 102 and configured to communicate with the WLAN node 106. In some embodiments, the ULNE 110 is comprised in the cellular communications network 104.

The ULNE 110 may communicate with the wireless device 108 either via the WLAN node 106 or via a radio network node serving the wireless device 108.

The cellular communications network 104 comprises a radio network node 112 for wireless communication with wireless devices, such as the wireless device 108, when they are located within a geographical area 112a served by the radio network node 112.

The radio network node 112 may be a transmission point such as a radio base station, for example an eNB, an eNodeB, or an Home Node B, an Home eNode B or any other network node capable to serve a user equipment or a machine type communication device in a cellular communications network, such as the cellular communications network 104.

An Authentication, Authorization and Accounting (AAA) unit 114 may be comprised in the integrated wireless communications network 100. In some embodiments the AAA unit 114 is comprised in the WLAN 102, but the AAA unit 114 or another AAA unit may be comprised in the cellular communications network 104. The AAA unit 114 may comprise one or more processes that involves establishing of an identity of the wireless device 108 and/or the WLAN node 106. Further the AAA unit 114 may configure authorizations to access particular types of service, and monitor traffic volumes for each user.

A method in the WLAN node 106 for handling of the integrated wireless communications network 100 will now be described with reference to a flow chart depicted in FIG. 2. As mentioned above, the WLAN node 106 and the wireless device 108 are operating in the integrated wireless communications network 100. The integrated wireless communications network 100 comprises the WLAN 102 and the cellular communications network 104. The method comprises one or more of the following actions. It should be understood that actions may be taken in another suitable order and that actions may be combined.

Action 201

In some embodiments, the WLAN node 106 receives, from the wireless device 108, a request for a first indication. As will described below, the first indication comprises information relating to the aggregation capability of the WLAN node 106. Thus, in some embodiments, when e.g. the wireless device 108 wants to receive information about the aggregation capability of the WLAN node 106, the wireless device 106 may send a request for the first indication to the WLAN node 106.

Action 201 relates inter alia to some fourth, eighth and ninth embodiments which will be described below.

Action 202

The WLAN node 106 may receive, from the wireless device 108, a second indication configured to indicate to the WLAN node 106 an aggregation capability of the wireless device 108. Thus, in some embodiments, the wireless device 108 wants to inform the WLAN node 106 about its aggregation capability, and as will be described in Action 203, the WLAN node 106 may take such information into account when determining the first indication comprising information relating to the aggregation capability of the WLAN node 106.

Action 202 relates inter alia to some fourth, eighth and ninth embodiments which will be described below.

Action 203

When the WLAN node 106 has received the second indication from the wireless device as mentioned in Action 202 above, the WLAN node 106 may determine the first indication based on the aggregation capability of the wireless device 108. That is, the WLAN node 106 may determine a response that is specific for the wireless device 108.

Action 203 relates inter alia to some fourth, eighth and ninth embodiments which will be described below.

Action 204

In some embodiments, the WLAN node 106 transmits the request for the first indication to an upper layer network entity 110 comprised in the integrated wireless communications network 100. By transmitting the request for the first indication to the upper layer network entity 110, the upper payer network entity 110 may decide which aggregation capability of the WLAN node 106 that is to be indicated to the wireless device 108. The decision may be based on information relating to the wireless device 108, to the WLAN node 106, and to the integrated wireless communications network 100.

Action 204 relates inter alia to some seventh embodiments which will be described below.

Action 205

When the WLAN node 106 has transmitted the request for the first indication to the upper layer network entity 110, as mentioned in Action 204 above, the WLAN node 106 receives the first indication from the upper layer network entity 110. Thus, the WLAN node 106 receives the first indication from the upper layer network node 110 in response to the request sent in Action 204. As will be described in Action 206, the WLAN node 106 transmits the first indication to the wireless device 108.

Action 207 relates inter alia to some seventh embodiments which will be described below.

Action 206

In order to indicate the aggregation capability to the wireless device 108, the WLAN node 106 transmits to the wireless device 108, the first indication configured to indicate to the wireless device 108, the aggregation capability of the WLAN node 106. By indicating the aggregation capability of the WLAN node 106 to the wireless device 108, handling of the integrated wireless communications network 100 is provided. Further, the wireless device 108 may use the aggregation capability for proper access network selection and traffic steering, whereby access network selection and traffic steering is enhanced. Thereby providing an improved performance in the integrated wireless communications network 100.

The first indication may comprise information relating to at least one type of aggregation supported by the WLAN node 106, wherein the at least one type of aggregation comprises at least one of Radio Link Control, RLC, aggregation; Packet Data Convergence Protocol, PDCP, aggregation; and Medium Access layer, MAC, level aggregation.

In some embodiments, the information relating to the at least one type of aggregation further comprises at least one priority indication associated with the at least one type of aggregation, which at least one priority indication is configured to reflect a preference of the WLAN node 106 to use the at least one type of aggregation associated with the at least one priority indication.

The at least one priority indication may be an explicit indication based on a presence of information, or an implicit indication based on an absence of information.

In some embodiments, the transmitting of the first indication further comprises transmitting the first indication only when the WLAN node 106 is configured to support aggregation.

The WLAN node 106 may be configured to transmit the first indication using broadcast signalling, wherein the first indication is comprised in an information element of a management frame such as a beacon frame, a probe response frame, an association response frame, or a reassociation response frame, or comprised in an information element of an action frame or a control frame.

In some embodiments, the WLAN node 106 is configured to transmit the first indication using unicast signalling.

The unicast signalling may be a dedicated 802.11 signalling, wherein the first indication is comprised in an information element of a management frame such as a probe response frame, an association response frame, or a reassociation response, or comprised in an information element of an action frame or a control frame.

In some embodiments, the unicast signalling is an Access Network Query Protocol, ANQP, signalling, wherein the first indication is comprised in an information element of a Generic Advertisement Service, GAS, Initial response frame.

Further, the first indication may be an explicit indication based on a presence of a parameter or information in the transmitted signalling, or wherein the first indication is an implicit indication based on an absence of a parameter or information in the transmitted signalling.

Action 206 relates to some first, second, third, fourth, fifth, sixth, seventh, eighth and ninth embodiments which will be described below.

To perform the method for handling of the integrated wireless communications network 100, the Wireless Local Area Network, WLAN, node 106 may comprise an arrangement depicted in FIG. 3. As previously mentioned, the WLAN node 106 and the wireless device 108 are operating in an integrated wireless communications network 100. The integrated wireless communications network 100 comprises a WLAN 102 and a cellular communications network 104.

In some embodiments, the WLAN node 106 comprises an input and/or output interface 300 configured to communicate with one or more other WLAN nodes, one or more other network nodes, or one or more communications devices, such as the wireless device 108. The input and/or output interface 300 may comprise a wireless receiver and a wireless transmitter.

The WLAN node 106 is configured to transmit, e.g. by means of a transmitting module 301, a first indication to the wireless device 108. The first indication is configured to indicate, to the wireless device 108, the aggregation capability of the WLAN node 106. The transmitting module 301 may be a processor 305 of the WLAN node 106. The processor 305 will be described in more detail below.

In some embodiments, the first indication is an explicit indication based on a presence of a parameter or information in the transmitted signalling, or wherein the first indication is an implicit indication based on an absence of a parameter or information in the transmitted signalling.

The first indication may comprise information relating to at least one type of aggregation supported by the WLAN node 106. Further, the at least one type of aggregation may comprise at least one of Radio Link Control (RLC) aggregation, Packet Data Convergence Protocol (PDCP) aggregation, and Medium Access layer (MAC) level aggregation.

In some embodiments, the information relating to the at least one type of aggregation further comprises at least one priority indication associated with the at least one type of aggregation. The at least one priority indication may be configured to reflect a preference of the WLAN node 106 to use the at least one type of aggregation associated with the at least one priority indication.

Further, the at least one priority indication may be an explicit indication based on a presence of information, or an implicit indication based on an absence of information.

Furthermore, in some embodiments, the WLAN node is configured to transmit the request for the first indication to an Upper Layer Network Entity (ULNE) 110 comprised in the integrated wireless communications network 100. In such embodiments, and as described below, the WLAN node 106 may be configured to receive the first indication from the upper layer network entity 110.

In some embodiments, the WLAN node 106 is further configured to transmit the first indication only when the WLAN node 106 is configured to support aggregation.

The WLAN node 106 may further be configured to transmit the first indication using broadcast signalling, wherein the first indication is comprised in an information element of a management frame such as a beacon frame, a probe response frame, an association response frame, or a reassociation response, or comprised an information element of an action frame or a control frame.

In some embodiments, the WLAN node 106 is further configured to transmit the first indication using unicast signalling.

The unicast signalling may be a dedicated 802.11 signalling, wherein the first indication is comprised in an information element of a management frame such as a probe response frame, an association response frame, or a reassociation response, or comprised an information element of an action frame or a control frame.

In some embodiments, the unicast signalling is an Access Network Query Protocol, ANQP, signalling, wherein the first indication is comprised in an information element of a Generic Advertisement Service, GAS, Initial response frame.

The WLAN node 106 may further be configured to receive, e.g. by means of a receiving module 302, from the wireless device 108, a request for the first indication. The receiving module 302 may be the processor 305 of the WLAN node 106.

Further, in some embodiments, the WLAN node 106 is configured to receive the first indication from the upper layer network entity 110. As mentioned above, the WLAN node 106 may receive the first indication from the upper layer network entity 110 in response to the request for the first indication transmitted from the WLAN node to the upper layer network entity 110.

The WLAN node 106 may further be configured to receive, from the wireless device 108, a second indication configured to indicate to the WLAN node 106 an aggregation capability of the wireless device 108.

In some embodiments, the WLAN node 106 further is configured to determine, e.g. by means of a determining module 303, the first indication based on the aggregation capability of the wireless device 108.

The determining module 303 may be the processor 305 of the WLAN node 106.

The WLAN node 106 may also comprise means for storing data such as user code data. In some embodiments, the transmitter 110 comprises a memory 304 configured to store the data. The user code data may be processed or non-processed user code data or data and/or information relating thereto. The memory 304 may comprise one or more memory units. Further, the memory 304 may be a computer data storage or a semiconductor memory such as a computer memory, a read-only memory, a volatile memory or a non-volatile memory. The memory 304 is arranged to be used to store obtained information, data, configurations, schedulings, and applications etc. to perform the methods herein when being executed in the WLAN node 106.

Embodiments herein for handling of the integrated wireless communications network 100 may be implemented through one or more processors, such as the processor 305 in the arrangement depicted in FIG. 3, together with computer program code for performing the functions and/or method actions of embodiments herein. The program code mentioned above may also be provided as a computer program product, for instance in the form of a data carrier carrying computer program code for performing the embodiments herein when being loaded into the WLAN node 106. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the WLAN node 106.

Those skilled in the art will also appreciate that the transmitting module, receiving module, and determining module described above may refer to a combination of analog and digital circuits, and/or one or more processors configured with software and/or firmware, e.g. stored in the memory, that when executed by the one or more processors such as the processors in the WLAN node 106 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

A method in the wireless device 108 for handling of the integrated wireless communications network 100 will now be described with reference to a flow chart depicted in FIG. 4. As mentioned above, the WLAN node 106 and the wireless device 108 are operating in the integrated wireless communications network 100. The integrated wireless communications network 100 comprises the WLAN 102 and the cellular communications network 104. The method comprises one or more of the following actions. It should be understood that actions may be taken in another suitable order and that actions may be combined.

Action 401

In some embodiments, the wireless device 108 transmits, to the WLAN node 106, a request for the first indication. Thus, in some embodiments, when e.g. the wireless device 108 wants to receive information about the aggregation capability of the WLAN node 106, the wireless device 106 may send a request for the first indication to the WLAN node 106.

Action 401 relates inter alia to some fourth, eighth and ninth embodiments which will be described below.

The request for the first indication may comprise the second indication mentioned in Action 402 below.

Action 402

The wireless device 108 may transmit, to the WLAN node 106, a second indication configured to indicate to the WLAN node 106 an aggregation capability of the wireless device 108. In such embodiments, a received first indication is based on the aggregation capability of the wireless device 108.

The wireless device 108 may transmit the second indication using unicast signalling. In some embodiments, the unicast signalling is a dedicated 802.11 signalling, wherein the second indication is comprised in an information element of a management frame such as a probe request frame, association request frame, or reassociation request, or comprised an information element of an action frame or a control frame.

Action 402 relates inter alia to some fourth, eighth and ninth embodiments which will be described below.

Action 403

The wireless device 108 receives, from the WLAN node 106, a first indication configured to indicate, to the wireless device 108, the aggregation capability of the WLAN node 106. By indicating the aggregation capability of the WLAN node 106 to the wireless device 108 handling of the integrated wireless communications network 100 is provided. As will described in Action 404 below, the wireless device 108 may use the aggregation capability for proper access network selection and traffic steering, whereby access network selection and traffic steering is enhanced. Thereby providing an improved performance in the integrated wireless communications network 100.

The first indication may be an explicit indication based on a presence of a parameter or information in the transmitted signalling, or the first indication may be an implicit indication based on an absence of a parameter or information in the transmitted signalling.

In some embodiments, the first indication comprises information relating to at least one type of aggregation supported by the WLAN node 106. The at least one type of aggregation may comprise at least one of Radio Link Control (RLC) aggregation, Packet Data Convergence Protocol (PDCP) aggregation, and Medium Access layer (MAC) level aggregation.

Further, the information relating to the at least one type of aggregation may further comprise at least one priority indication associated with the at least one type of aggregation, which at least one priority indication is configured to reflect a preference of the WLAN node 106 to use the at least one type of aggregation associated with the at least one priority indication.

In some embodiments, the at least one priority indication is an explicit indication based on a presence of information, or an implicit indication based on an absence of information.

Further, the wireless device 108 may receive the first indication only when the WLAN node 106 and/or the wireless device 108 is configured to support aggregation.

In some embodiments, the wireless device 108 receives the first indication in a broadcast signal, wherein the first indication is comprised in an information element of a management frame such as a beacon frame, a probe response frame, an association response frame, or a reassociation response, or comprised an information element of an action frame or a control frame.

In some other embodiments, the wireless device 108 receives the first indication in a unicast signal. The unicast signal may be a dedicated 802.11 signal, wherein the first indication is comprised in an information element of a management frame such as a probe response frame, an association response frame, or a reassociation response, or comprised an information element of an action frame or a control frame. Alternatively, the unicast signal is an Access Network Query Protocol, ANQP, signal, wherein the first indication is comprised in an information element of a Generic Advertisement Service, GAS, Initial response frame.

Action 403 relates to some first, second, third, fourth, fifth, sixth, seventh, eighth and ninth embodiments which will be described below.

Action 404

As mentioned above, the wireless device 108 may use the aggregation capability received in the first indication for proper access network selection and traffic steering, whereby access network selection and traffic steering is enhanced. Thereby providing an improved performance in the integrated wireless communications network 100.

In some embodiments, the wireless device 108 performs, based on the aggregation capability of the WLAN node 106, an access network selection and/or a traffic steering decision. Further, in addition to the aggregation capability of the WLAN node 106, the wireless device 108 may perform the access network selection and/or the traffic steering decision based on one or more threshold values, one or more rules and/or one or more policies for or relating to access network selection and/or the traffic steering.

To perform the method for handling of the integrated wireless communications network 100, the wireless device 108 may comprise an arrangement depicted in FIG. 5. As previously mentioned, the WLAN node 106 and the wireless device 108 are operating in the integrated wireless communications network 100. The integrated wireless communications network 100 comprises the WLAN 102 and the cellular communications network 104.

In some embodiments, the wireless device 108 comprises an input and/or output interface 500 configured to communicate with one or more other WLAN nodes, such as the WLAN node 106, one or more other network nodes, or one or more communications devices, such as one or more other wireless devices. The input and/or output interface 500 may comprise a wireless receiver and a wireless transmitter.

The wireless device 108 is configured to receive, e.g. by means of a receiving module 501, a first indication from the WLAN node 106, which first indication is configured to indicate, to the wireless device 108, the aggregation capability of the WLAN node 106. The receiving module 501 may be a processor 505 of the wireless device 108. The processor 505 will be described in more detail below.

The first indication may be an explicit indication based on a presence of a parameter or information in the transmitted signalling. Alternatively, the first indication may be an implicit indication based on an absence of a parameter or information in the transmitted signalling.

In some embodiments, the first indication comprises information relating to at least one type of aggregation supported by the WLAN node 106. The at least one type of aggregation may comprise at least one of RLC aggregation, PDCP aggregation, and MAC level aggregation.

Further, the information relating to the at least one type of aggregation may further comprise at least one priority indication associated with the at least one type of aggregation. The at least one priority indication may be configured to reflect a preference of the WLAN node 106 to use the at least one type of aggregation associated with the at least one priority indication.

In some embodiments, the at least one priority indication is an explicit indication based on a presence of information or an implicit indication based on an absence of information.

The wireless device 108 may further be configured to receive the first indication only when the WLAN node 106 and/or the wireless device 108 is configured to support aggregation.

In some embodiments, the wireless device 108 is further configured to receive the first indication in a broadcast signal, wherein the first indication is comprised in an information element of a management frame such as a beacon frame, a probe response frame, an association response frame, or a reassociation response frame, or comprised in an information element of an action frame or a control frame.

Alternatively or in addition, the wireless device 108 is further configured to receive the first indication in a unicast signal.

The unicast signal may be a dedicated 802.11 signal, wherein the first indication is comprised in an information element of a management frame such as a probe response frame, an association response frame, or a reassociation response, or comprised in an information element of an action frame or a control frame.

In some embodiments, the unicast signal is an ANQP signal, wherein the first indication is comprised in an information element of a GAS Initial response frame.

In some embodiments, the wireless device 108 is configured to transmit, e.g. by means of a transmitting module 502, a request for the first indication to the WLAN node 106. The transmitting module 502 may be the processor 505 of the wireless device 108.

Further, the wireless device 108 may be configured to transmit, to the WLAN node 106, a second indication configured to indicate to the WLAN node 106 an aggregation capability of the wireless device 108. In such embodiments, the received first indication may be based on the aggregation capability of the wireless device 108.

In some embodiments, the request for the first indication comprises the second indication.

The wireless device 108 may further be configured to transmit the second indication using unicast signalling.

In some embodiments, the unicast signalling is a dedicated 802.11 signalling, wherein the second indication is comprised in an information element of a management frame such as a probe request frame, an association request frame, or a reassociation request, or comprised an information element of an action frame or a control frame.

In some embodiments, the wireless device 108 is configured to perform, e.g. by means of a performing module 503, an access network selection and/or a traffic steering decision, based on the aggregation capability of the WLAN ode 106.

Further, the wireless device 108 may be configured to perform the access network selection and/or the traffic steering decision based on, in addition to the aggregation capability of the WLAN node 106, one or more threshold values, one or more rules and/or one or more policies for or relating to access network selection and/or the traffic steering.

The performing module 503 may be the processor 505 of the wireless device 108.

As mentioned above, the wireless device 108 may be configured to use the aggregation capability received in the first indication for proper access network selection and traffic steering, whereby access network selection and traffic steering is enhanced. Thereby providing an improved performance in the integrated wireless communications network 100.

The wireless device 108 may also comprise means for storing data such as user code data. In some embodiments, wireless device 108 comprises a memory 504 configured to store the data. The user code data may be processed or non-processed user code data or data and/or information relating thereto. The memory 504 may comprise one or more memory units. Further, the memory 504 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the wireless device 108.

Embodiments herein for handling of the integrated wireless communications network 100 may be implemented through one or more processors, such as the processor 505 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the in the wireless device 108. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the wireless device 108.

Those skilled in the art will also appreciate that the receiving module, the transmitting module and the performing module above may refer to a combination of analog and digital circuits, and/or one or more processors configured with software and/or firmware, e.g. stored in the memory, that when executed by the one or more processors such as the processors in the wireless device 108 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplifying Embodiments

Some exemplifying embodiments will now be described in more detail. However, it should be noted that though the examples and descriptions used in some embodiments herein are often based on LTE, all embodiments are still applicable to scenarios where a WLAN is being integrated with other 3GPP RATs such as UMTS or even non-3GPP cellular RATs such as CDMA2000 or other RATs.

Some embodiments herein provide different mechanisms for the WLAN network 102 to provide, to the wireless device 108, information regarding network capabilities related to RAN level aggregation. This may be information related to whether and in which flavor the WLAN network 102 supports the tight aggregation. The tight aggregation will be described in more detail below under the respective heading "Tight integration between 3GPP and WLAN. However, embodiments are not limited to only these two features alone and may be applied to other type of interworking capability information. This information will herein be referred to as Network Aggregation Capability Information (NACI).

Content of NACI

Examples of First Embodiments

In some first embodiments, the NACI indicates whether a network node 106 supports aggregation or not. This may be done in different ways. For example, it may be done by providing in the NACI a flag which is set to one value, e.g. 1, to indicate that aggregation is supported, and set to another value, e.g. 0, to indicate that aggregation is not supported. Another possibility is that a presence of the flag indicates that that the network node 106 supports aggregation, while an absence of the flag indicates that aggregation is not supported. This latter implementation may be beneficial since a network node 106 which does not support aggregation does not need to be upgraded to be able to provide any flag.

One way to implement the unicast signalling is to extend the currently existing ANQP procedures to include considerations for aggregation. One way to do that is by introducing a new Query Element in the list of existing elements, which list is described below under the heading "Tight integration between 3GPP and WLAN". This is shown in the table below:

| Query Element Name | Subtype Value |
| --- | --- |
| Reserved | 0 |
| HS Query list | 1 |
| ... | ... |
| Icon Binary File | 11 |
| Aggregation Supported | 12 |
| Reserved | 13-255 |

Examples of Second Embodiments

In some second embodiments, NACI comprises details regarding the aggregation supported by the network node 106. The details may relate to a type of aggregation supported such as RLC-, PDCP-, MAC-level aggregation, etc. The network node 106 may support multiple aggregation solutions and may therefore also indicate the support for multiple aggregation solutions. Furthermore, a priority indicator may be associated with each aggregation type in order to reflect the network's, e.g. the network node's 106, preference on which aggregation type to be used.

One way to indicate the additional details about the aggregation supported is by introducing new Query Elements in the list of existing elements, which list is described below under the heading "Tight integration between 3GPP and WLAN". This is shown in the table below:

| Query Element Name | Subtype Value |
| --- | --- |
| Reserved | 0 |
| HS Query list | 1 |
| ... | ... |
| Icon Binary File | 11 |
| Aggregation Supported | 12 |
| Aggregation Supported - MAC | 13 |
| Aggregation Supported - RLC | 14 |
| Aggregation Supported - PDCP | 15 |
| Etc. | 16 ... |
| Reserved | 17-255 |

Provisioning of NACI

Examples of Third Embodiments

Figure 6:
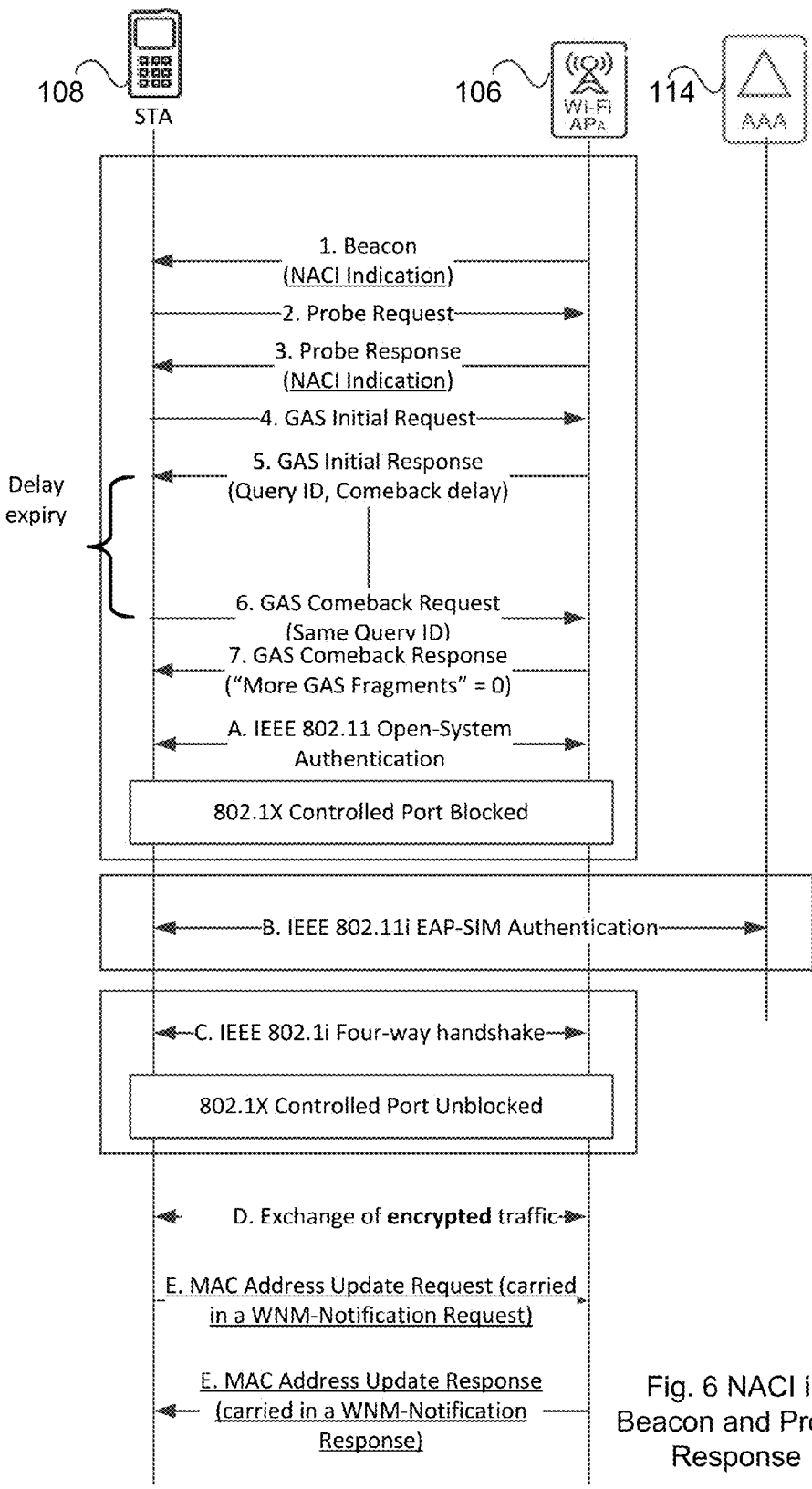
FIG. 6 is a sequence diagram illustrating a method in embodiments of an integrated wireless communications network.

In some third embodiments, NACI may be provided by a WLAN AP using broadcast signalling. An example of a way to implement this is via a new Information Element (IE), which may be added to the Beacon and/or Probe Response frames. Furthermore, currently existing IEs may be extended in order to comprise NACI. An example flow chart of the signalling mechanisms mentioned above is shown in FIG. 6.

Examples of Fourth Embodiments

Figure 7:
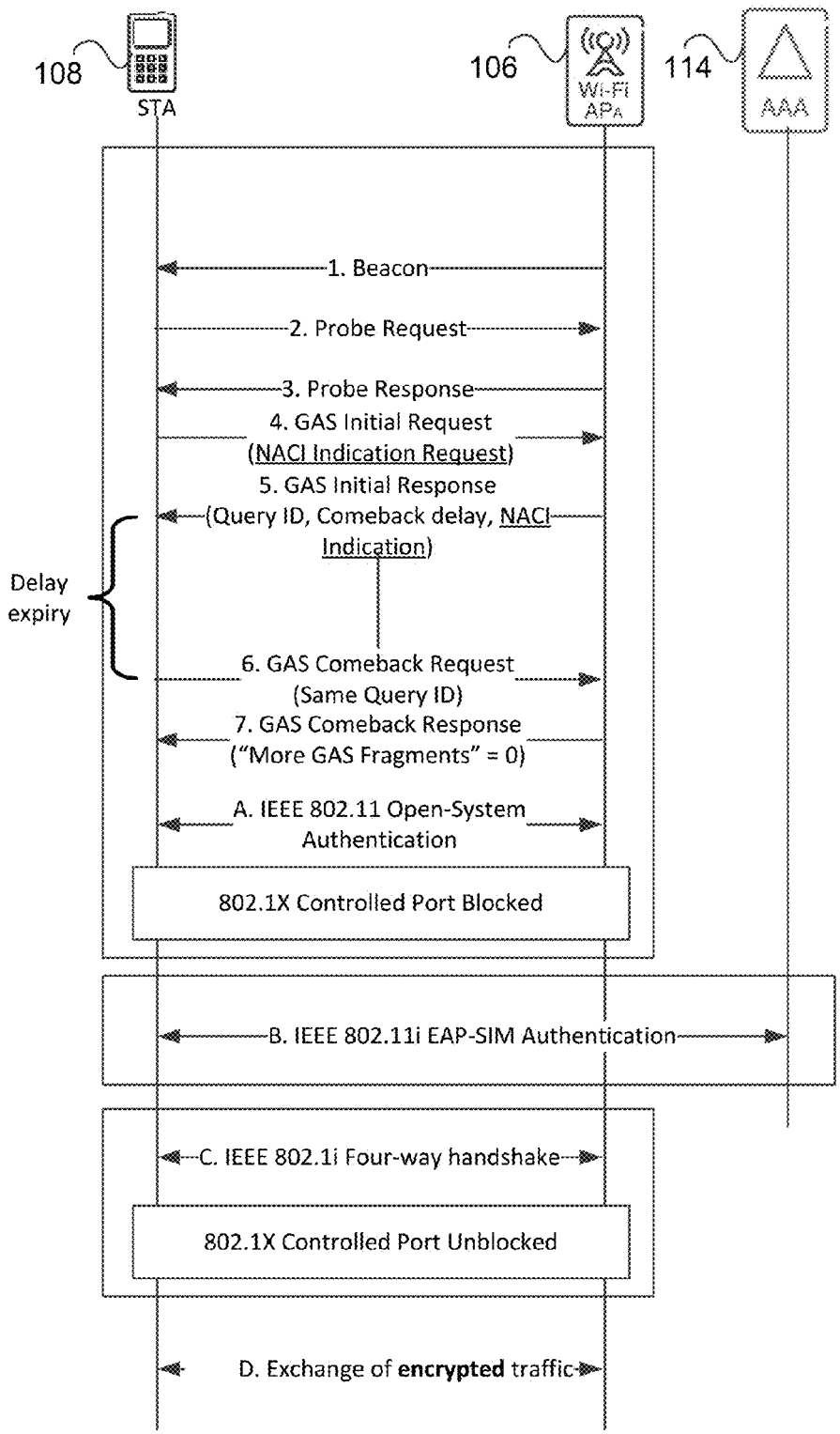
FIG. 7 is a sequence diagram illustrating a method in embodiments of an integrated wireless communications network.

In some fourth embodiments, the UE, such as the wireless device 108, may explicitly request information about whether or not the WLAN node 106, e.g. a WLAN AP, supports aggregation. It may also provide details on the type of aggregation supported by the UE, such as the wireless device 108. Using this information, the WLAN AP 106 may provide a UE-specific response. One possibility to implement this mechanism is to include additional IE in the Probe Response frame or extend a currently existing IE. Using this, the UE, such as the wireless device 108, may explicitly request the aggregation information when it decided to associate via a network. This embodiment is about using 802.11 signalling for NACI. The signalling above is exemplified in FIG. 7 Error! Reference source not found.

Examples of Fifth Embodiments

Figure 8:
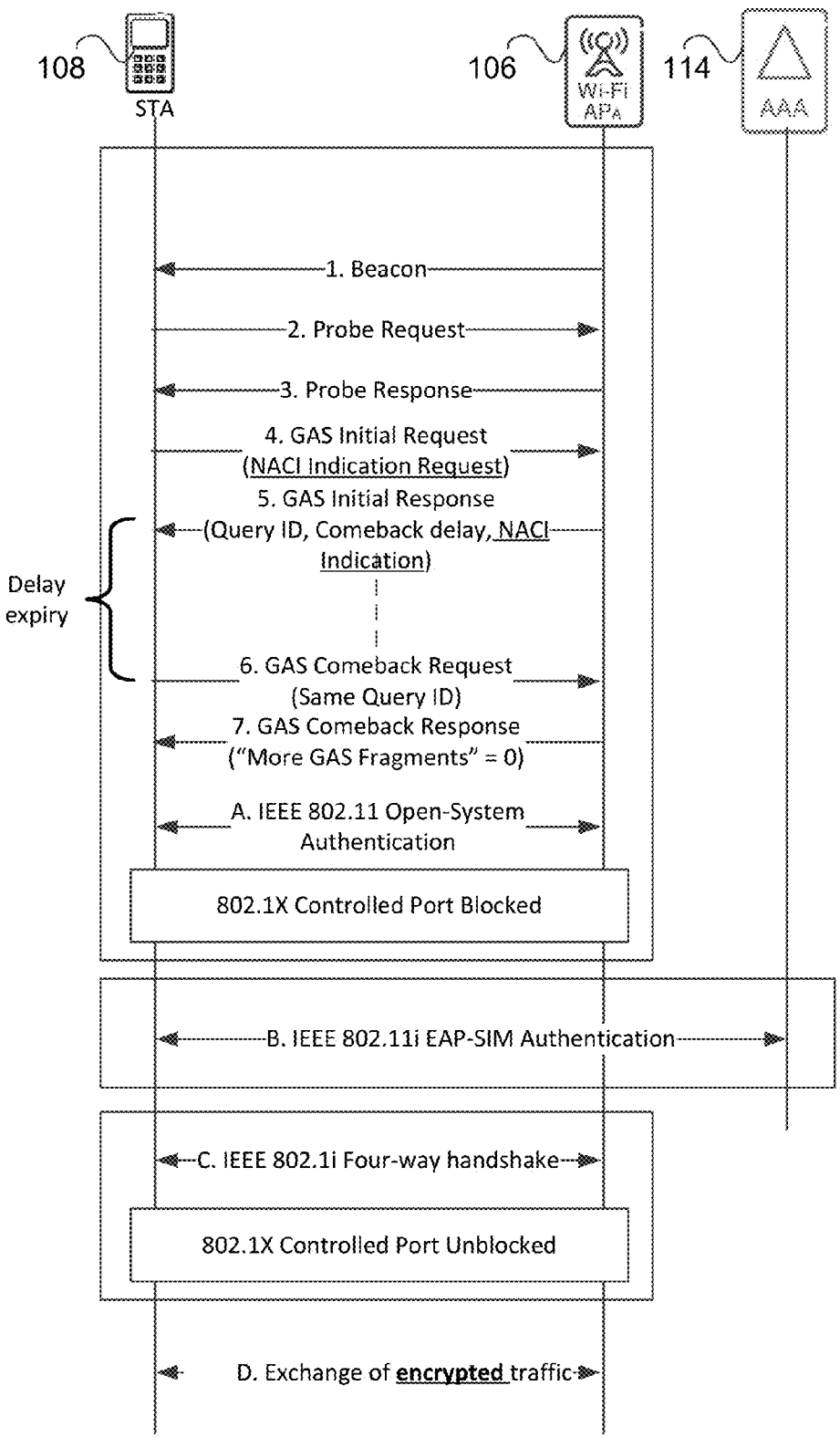
FIG. 8 is a sequence diagram illustrating a method in embodiments of an integrated wireless communications network.

In some fifth embodiments, the WLAN AP, such as the WLAN node 106, provides unicast information whether or not it supports aggregation. This is about using ANQP signalling for NACI, as will be described in more detail below under the heading "Access network Query protocol (ANQP)". The unicast information may be triggered by the UE, such as the wireless device 108, requesting this specific information which has the benefit that the network only provides the indication when the UE, such as the wireless device 108, is interested of applying aggregation. It would also be possible that the indication is part of generic information provided to any UE, such as the wireless device 108, requesting the AP's capabilities. The signalling is exemplified on FIG. 8.

If the NACI is signalled to the UE, such as the wireless device 108, using dedicated signalling the network may take in to account the UE's capability or incapability of performing aggregation when deciding whether to indicate the network aggregation capability information. The WLAN node 106 may determine whether a UE, such as the wireless device 108, supports aggregation based on UE, such as the wireless device 108, provided capability signalling. For example, the unicast information may be provided to the UE, such as the wireless device 108, during the connection establishment procedure between the UE, such as the wireless device 108, and WLAN node 106. During such a procedure a handshake procedure may be performed and during this handshake procedure the WLAN node 106 may provide the indication indicating whether the WLAN node 106 supports aggregation. It would also be possible that the indication is signalled in a message following the connection establishment procedure.

Examples of Sixth Embodiments

In some sixth embodiments, the NACI is an implicit indication. For example, the UE, such as the wireless device 108, may consider that the WLAN node 106 indicates that aggregation is supported based on no presence, e.g. absence, of configuration parameters and/or information which is used when performing for aggregation. For example, the UE, such as the wireless device 108, may consider that the network has implicitly indicated support for the aggregation if a certain broadcast signalling is provided to the UE, such as the wireless device 108. This embodiment may be used together with any of the third, fourth and fifth embodiments mentioned above.

Examples of Seventh Embodiments

Figure 9:
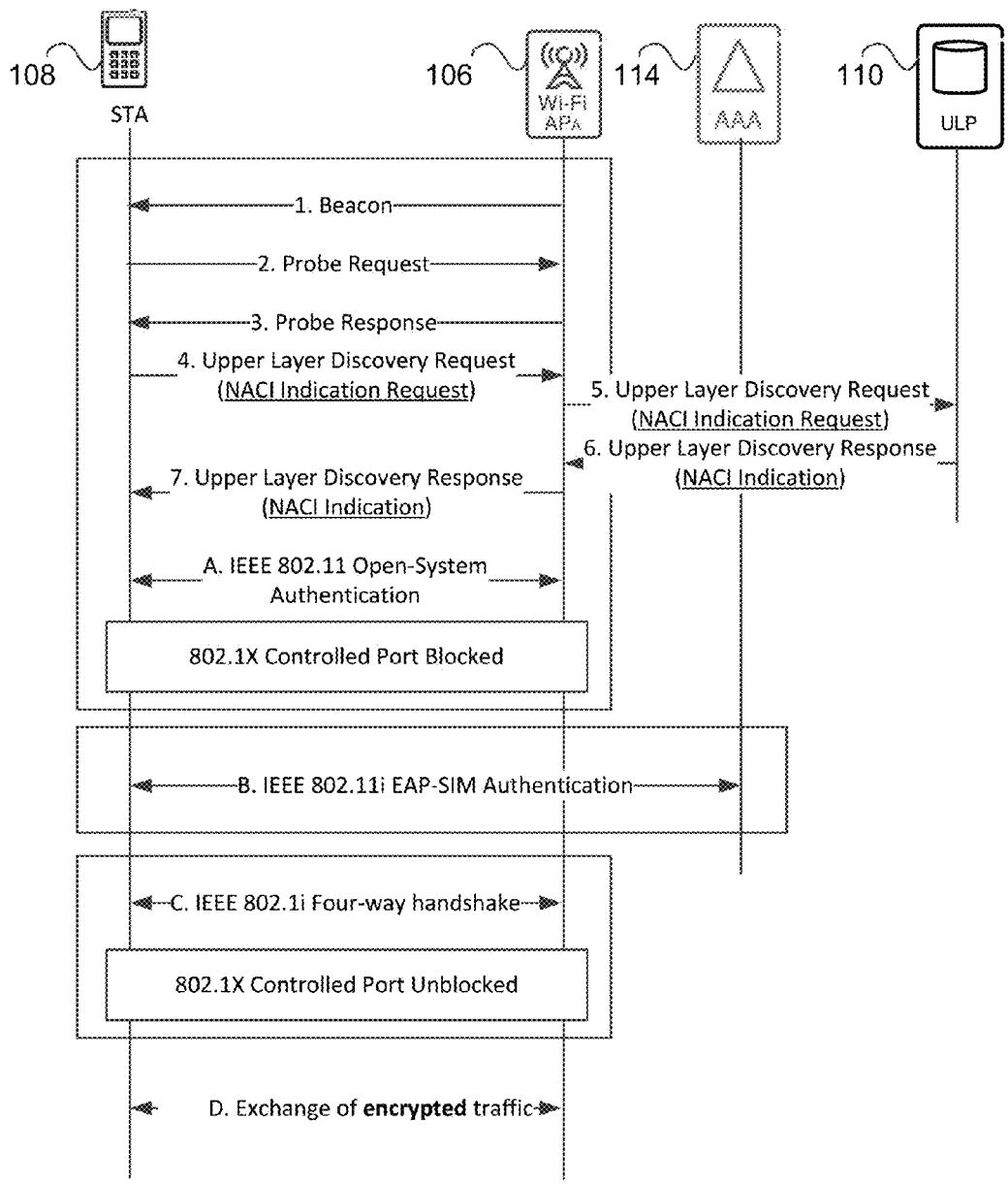
FIG. 9 is a sequence diagram illustrating a method in embodiments of an integrated wireless communications network.

In some seventh embodiments, the UE, such as the wireless device 108, exchanges information with an upper layer network entity 110, i.e., a service-discovery proxy, where the WLAN AP, such as the WLAN node 106, plays a role of a frame forwarder either in a transparent or non-transparent way. The information exchange between the UE, such as the wireless device 108, and the proxy, such as the upper layer network entity 110, occur by the means of upper layer protocol. As in some fifth embodiments, the WLAN node 106 may provide the information regarding the aggregation capabilities based on the UE capabilities. The decision may be taken either by the WLAN AP, such as the WLAN node 106, when it e.g. acts as a non-transparent forwarder, or by the proxy, such as the upper layer network entity 110, when the WLAN node 106 e.g. acts a transparent forwarder. An example signalling of the procedure is shown in FIG. 9.

Examples of Eighth Embodiments

In some eighth embodiments, the UE, such as the wireless device 108, may explicitly request information on whether or not the WLAN node 106, e.g. a WLAN AP, supports aggregation. The UE, such as the wireless device 108, may also provide details on the type of aggregation supported by the UE, such as the wireless device 108. Using this information, the WLAN node 106 may decide whether or not to respond to the UE 108. If the WLAN node 106 does not support aggregation, or only supports a certain type of aggregation(s) not supported by the UE, such as the wireless device 108, it may decide not to respond to the request, saving radio resources. One possibility to implement this mechanism is to not send a Probe Response frame, after a Probe Request frame has been received by the UE, such as the wireless device 108.

Examples of Ninth Embodiments

In some ninth embodiments, it is the UE, such as the wireless device 108, that reports its aggregation capability information to the WLAN node 106, i.e., the WLAN AP. The aggregation capability information is hereafter referred to as Terminal Aggregation Capability Information (TACI). The TACI may have the same content as the NACI, described in some first and second embodiments above, and may be communicated via mechanisms similar to the ones used for communicating the NACI, e.g.
 The UE, such as the wireless device 108, may provide the TACI in a Probe Request frame, e.g. similar to the mechanism described in some fourth embodiments above;
 The UE, such as the wireless device 108, may provide the TACI via pre-association frames exchange, in an ANQP or similar messages, e.g. similar to the mechanism described in some fifth embodiments above;
 The UE, such as the wireless device 108, may provide the TACI via upper layer protocol exchange with the AP, e.g. similar to the mechanism described in some seventh embodiments above;
 It may also be the case that the WLAN node 106 explicitly requests the TACI from the UE, such as the wireless device 108.

Tight Integration between 3GPP and WLAN

Figure 10:
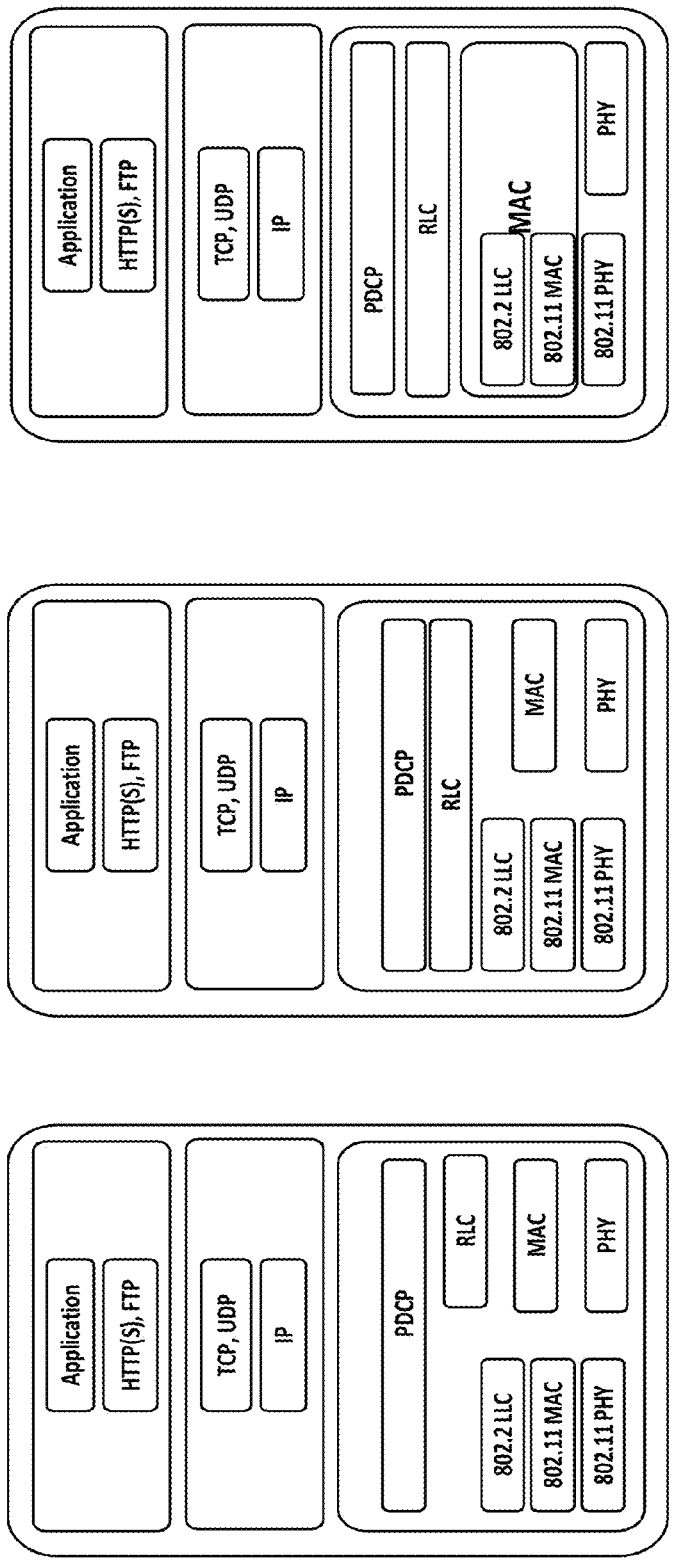
FIG. 10 schematically illustrates different levels of aggregation in embodiments of an integrated wireless communications network.

Within the scope of 3GPP Release-13, there has been a growing interest in realizing an even tighter integration and/or aggregation between 3GPP and WLAN. Such an aggregation is expected to make it possible for a more optimal aggregation opportunity as compared to Multi-Path Transmission Control Protocol (MPTCP), as the aggregation is performed at a lower layer and as such the scheduling and flow control of the data on the WLAN and 3GPP links may be controlled by considering dynamic radio network conditions. FIG. 10 schematically illustrates three different protocol options of aggregation at the a) Packet Data Convergence Protocol (PDCP), b) Radio Link Control (RLC) and c) Medium Access Layer (MAC) levels. FIG. 10 is schematically showing the main principles for these three aggregation levels and additional functionality may be needed. For example in the PDCP-level aggregation, an additional protocol layer may be used between the PDCP layer and the 802.2 Logical Link Control (LLC) layer to convey information about the UE, such as the wireless device 108, and the radio bearer the traffic is associated with.

Note that FIG. 10 is showing the protocol stack at a UE, such as the wireless device 108, or an integrated and/or co-located eNB-WLAN AP station. In the case of a standalone WLAN node 106, such as a WLAN AP, and radio network node 112, such as an eNB, i.e. the WLAN AP and the eNB are non co-located stations, the protocol stack for supporting aggregation is a little bit different, as the LLC frames have now to be relayed towards the standalone eNB.

Access Network Query Protocol (ANQP)

The ANQP provides means for the UE, such as the wireless device 108, to discover a variety of WLAN capabilities in a pre-associated state, i.e., before the UE, such as the wireless device 108, establishes a connection to the WLAN node 106. The ANQP is encapsulated in Generic Advertisement Protocol (GAS) frames as schematically shown in FIG. 11. Details on how the UE, such as the wireless device 108, carries the pre-association discovery are provided in the text below.
 1. If the UE, such as the wireless device 108, is relying on passive scanning procedures for AP discovery, the UE, such as the wireless device 108, waits until it receives a Beacon frame from the WLAN node 106;
 2. If the UE, such as the wireless device 108, uses active scanning, it may generate a Probe Request and send it to the WLAN node 106;
 3. The WLAN node 106 answers with Probe Response;
 4. After the UE, such as the wireless device 108, recognized that the WLAN node 106 supports Generic Advertisement Service (GAS), the UE, such as the wireless device 108, then generates a GAS Initial Request in order to obtain information about an internet working service;
 5. The WLAN node 106 responds with GAS Initial Response. If the information requested by the UE, such as the wireless device 108, cannot be fitted into one GAS frame and fragmentation is needed, the WLAN node 106 may include a GAS Query ID and GAS Comeback Delay information. The delay indicates the amount of time that the requesting UE, such as the wireless device 108, should wait before another GAS Comeback frame exchange may be performed;
 6. After the GAS Comeback Delay has expired, the UE, such as the wireless device 108, sends a GAS Comeback Request requesting the rest of the information. The UE, such as the wireless device 108, may use the same Query ID, as previously assigned by the WLAN node 106;
 7. The WLAN node 106 responds with GAS Comeback Response. Once all the GAS Comeback Response frames have been received, the UE, such as the wireless device 108, may defragment and process the information. The WLAN node 106 may indicate the last fragment by setting the "More GAS Fragments" bit in the Fragment ID field in the GAS Comeback Response to "0".

NOTE 1: In the "Advertisement Protocol Element" field, part of the GAS frame the UE, such as the wireless device 108, may include an ANQP query. ANQP queries are used to obtain miscellaneous network information, including Network Access Identifier (NAI) Realm, 3GPP Cellular Network Information, etc. If the UE, such as the wireless device 108, is performing an ANQP query, it includes query list, describing all the information that the UE, such as the wireless device 108, is querying for.

NOTE 2: The AP 106 may forward or proxy the ANQP queries to a backend advertisement server (not shown) if the requested information is not locally available the WLAN node 106.

In the currently existing technology, the following values are included in the ANQP query list:

| Query Element Name | Subtype Value |
|---|---|
| Reserved | 0 |
| HS Query list | 1 |
| HS Capability list | 2 |
| Operator Friendly Name | 3 |
| WAN Metrics | 4 |
| Connection Capability | 5 |
| NAI Home Realm Query | 6 |
| Operating Class Indication | 7 |
| OSU Providers list | 8 |
| Reserved | 9 |
| Icon Request | 10 |
| Icon Binary File | 11 |
| Reserved | 12-255 |

When using the word "comprise" or "comprising" it shall be interpreted as non-limiting, i.e. meaning "consist at least of". Further, when using the word "a", or "an" herein it should be interpreted as "at least one", "one or more", etc.

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a Wireless Local Area Network, WLAN, node for handling of an integrated wireless communications network, the WLAN node and a wireless device operating in the integrated wireless communications network, which integrated wireless communications network comprises a WLAN and a cellular communications network, and the method comprising:
   transmitting, to the wireless device, a first indication configured to indicate, to the wireless device, the aggregation capability of the WLAN node, the first indication including at least one priority indication configured to reflect a preference of the WLAN node to use at least one type of aggregation associated with the at least one priority indication, the first indication being transmitted only when the WLAN node is configured to support aggregation;
   receiving, from the wireless device, a second indication configured to indicate to the WLAN node an aggregation capability of the wireless device; and
   determining the first indication based on the aggregation capability of the wireless device.

2. The method of claim 1, wherein the first indication comprises information relating to at least one type of aggregation supported by the WLAN node, and wherein the at least one type of aggregation comprises at least one of Radio Link Control, RLC, aggregation; Packet Data Convergence Protocol, PDCP, aggregation; and Medium Access layer, MAC, level aggregation.

3. The method of claim 1, wherein the at least one priority indication is one of:
   an explicit indication based on a presence of information; and
   an implicit indication based on an absence of information.

4. The method of claim 1, further comprising:
   receiving, from the wireless device, a request for the first indication.

5. The method of claim 4, further comprising:
   transmitting the request for the first indication to an upper layer network entity comprised in the integrated wireless communications network; and
   receiving the first indication from the upper layer network entity.

6. The method of claim 1, wherein transmitting the first indication further comprises:
   transmitting the first indication using broadcast signaling, wherein the first indication is comprised in one of:
   an information element of a management frame, the management frame being one of a beacon frame, a probe response frame, an association response frame and a reassociation response frame; and
   an information element of one of an action frame and a control frame.

7. The method of claim 6, wherein the first indication is one of:
   an explicit indication based on a presence of one of a parameter and information in the transmitted signaling; and
   an implicit indication based on one of an absence of a parameter and information in the transmitted signaling.

8. The method of claim 1, wherein the transmitting the first indication further comprises:
   transmitting the first indication using unicast signaling.

9. The method of claim 8, wherein the unicast signaling is a dedicated 802.11 signaling, wherein the first indication is comprised in one of:
   an information element of a management frame, the management frame being one of a probe response frame, an association response frame and a reassociation response; and
   an information element of one of an action frame and a control frame.

10. The method of claim 8, wherein the unicast signalling is an Access Network Query Protocol, ANQP, signaling, wherein the first indication is comprised in an information element of a Generic Advertisement Service, GAS, Initial response frame.

11. A method in a wireless device for handling of an integrated wireless communications network, a Wireless Local Area Network, WLAN, node and the wireless device operating in the integrated wireless communications network, which integrated wireless communications network comprises a WLAN and a cellular communications network, and wherein the method comprises:
   receiving, from the WLAN node, a first indication configured to indicate, to the wireless device, the aggregation capability of the WLAN node, the first indication including at least one priority indication configured to reflect a preference of the WLAN node to use at least one type of aggregation associated with the at least one priority indication, the first indication being received only when the WLAN node is configured to support aggregation, the first indication based on an aggregation capability of the wireless device; and
   transmitting, from the wireless device, a second indication configured to indicate to the WLAN node the aggregation capability of the wireless device.

12. The method of claim 11, further comprising:
performing, based on the aggregation capability of the WLAN node, at least one of an access network selection and a traffic steering decision.

13. The method of claim 11, further comprising:
transmitting, to the WLAN node, a request for the first indication.

14. The method of claim 13, wherein the request for the first indication comprises the second indication.

15. The method of claim 13 wherein transmitting the second indication, further comprises:
transmitting the second indication using unicast signaling.

16. The method of claim 15, wherein the unicast signaling is a dedicated 802.11 signalling, wherein the second indication is comprised in one of:
an information element of a management frame, the management frame being one of: a probe request frame, association request frame and reassociation request; and
an information element of one of an action frame and a control frame.

17. The method of claim 11, wherein the first indication comprises information relating to at least one type of aggregation supported by the WLAN node, and wherein the at least one type of aggregation comprises at least one of Radio Link Control, RLC, aggregation; Packet Data Convergence Protocol, PDCP, aggregation; and Medium Access layer, MAC, level aggregation.

18. The method of claim 17, wherein the at least one priority indication is one of:
an explicit indication based on a presence of information; and
an implicit indication based on an absence of information.

19. The method of claim 11, wherein receiving the first indication further comprises:
receiving the first indication only when at least one of the WLAN node and the wireless device is configured to support aggregation.

20. The method of claim 11, wherein receiving the first indication further comprises:
receiving the first indication in a broadcast signal, wherein the first indication is comprised in one of:
an information element of a management frame, the management frame being one of: a beacon frame, a probe response frame, an association response frame, or a reassociation response; and
an information element of one of an action frame and a control frame.

21. The method of claim 20, wherein the first indication is one of:
an explicit indication based on one of a presence of one of a parameter and information in the transmitted signaling; and
an implicit indication based on one of an absence of a parameter and information in the transmitted signaling.

22. The method of claim 11, wherein receiving the first indication further comprises:
receiving the first indication in a unicast signal.

23. The method of claim 22, wherein the unicast signal is a dedicated 802.11 signal, wherein the first indication is comprised in one of:
an information element of a management frame, the management frame being one of a beacon frame, a probe response frame, an association response frame and a reassociation response frame; and
an information element of one of an action frame and a control frame.

24. The method of claim 22, wherein the unicast signal is an Access Network Query Protocol, ANQP, signal, wherein the first indication is comprised in an information element of a Generic Advertisement Service, GAS, Initial response frame.

25. A Wireless Local Area Network, WLAN, node for handling of an integrated wireless communications network, the WLAN node and a wireless device operating in the integrated wireless communications network, which integrated wireless communications network comprises a WLAN and a cellular communications network, the WLAN node comprising a memory and a processor which configure the WLAN to:
transmit, to the wireless device, a first indication configured to indicate, to the wireless device, the aggregation capability of the WLAN node, the first indication including at least one priority indication configured to reflect a preference of the WLAN node to use at least one type of aggregation associated with the at least one priority indication, the first indication being transmitted only when the WLAN node is configured to support aggregation; and
receive, from the wireless device, a second indication configured to indicate to the WLAN node an aggregation capability of the wireless device; and
the first indication being based on the aggregation capability of the wireless device.

26. The WLAN node of claim 25, wherein the first indication comprises information relating to at least one type of aggregation supported by the WLAN node, and wherein the at least one type of aggregation comprises at least one of Radio Link Control, RLC, aggregation; Packet Data Convergence Protocol, PDCP, aggregation; and Medium Access layer, MAC, level aggregation.

27. The WLAN node of claim 26, wherein the at least one priority indication is one of:
an explicit indication based on a presence of information; and
an implicit indication based on an absence of information.

28. The WLAN node of claim 27, wherein the WLAN node further is configured to transmit the request for the first indication to an upper layer network entity comprised in the integrated wireless communications network; and wherein the WLAN node further is configured to receive the first indication from the upper layer network entity.

29. The WLAN node of claim 25, wherein the WLAN node further is configured to receive, from the wireless device, a request for the first indication.

30. The WLAN node of claim 25, wherein the WLAN node further is configured to transmit the first indication using broadcast signaling, wherein the first indication is comprised in one of:
an information element of a management frame, the management frame being one of a beacon frame, a probe response frame, an association response frame and a reassociation response frame; and
an information element of one of an action frame and a control frame.

31. The WLAN node of claim 25, wherein the WLAN node further is configured to transmit the first indication using unicast signaling.

32. The WLAN node of claim 31, wherein the unicast signaling is a dedicated 802.11 signalling, wherein the first indication is comprised in one of:
an information element of a management frame, the management frame being one of a beacon frame, a probe response frame, an association response frame and a reassociation response frame; and an information element of one of an action frame and a control frame.

33. The WLAN node of claim 31, wherein the unicast signaling is an Access Network Query Protocol, ANQP, signalling, wherein the first indication is comprised in an information element of a Generic Advertisement Service, GAS, Initial response frame.

34. The WLAN node of claim 25, wherein the first indication is one of:
an explicit indication based on a presence of a parameter or information in the transmitted signaling; and
an implicit indication based on an absence of a parameter or information in the transmitted signaling.

35. A wireless device for handling of an integrated wireless communications network, a Wireless Local Area Network, WLAN, node and the wireless device operating in the integrated wireless communications network, which integrated wireless communications network comprises a WLAN and a cellular communications network, the wireless device comprising a memory and a processor which configure the wireless device to:
receive, from the WLAN node, a first indication configured to indicate, to the wireless device, the aggregation capability of the WLAN node, the first indication including at least one priority indication configured to reflect a preference of the WLAN node to use at least one type of aggregation associated with the at least one priority indication, the first indication being received only when the WLAN node is configured to support aggregation, the first indication based on an aggregation capability of the wireless device; and
transmit, from the wireless device, a second indication configured to indicate to the WLAN node the aggregation capability of the wireless device.

36. The wireless device of claim 35, wherein the wireless device is further configured to perform, based on at least one of the aggregation capability of the WLAN node, an access network selection and a traffic steering decision.

37. The wireless device of claim 35, wherein the wireless device further is configured to transmit, to the WLAN node, a request for the first indication.

38. The wireless device of claim 37, wherein the request for the first indication comprises the second indication.

39. The wireless device of claim 37, wherein the wireless device further is configured to transmit the second indication using unicast signaling.

40. The wireless device of claim 39, wherein the unicast signaling is a dedicated 802.11 signalling, wherein the second indication is comprised in one of:
an information element of a management frame, the management frame being one of: a probe request frame, association request frame and reassociation request; and an information element of one of an action frame and a control frame.

41. The wireless device of claim 37, wherein the first indication comprises information relating to at least one type of aggregation supported by the WLAN node, and wherein the at least one type of aggregation comprises at least one of Radio Link Control, RLC, aggregation; Packet Data Convergence Protocol, PDCP, aggregation; and Medium Access layer, MAC, level aggregation.

42. The wireless device of claim 41, wherein the at least one priority indication is one of:
an explicit indication based on a presence of information; and
an implicit indication based on an absence of information.

43. The wireless device of claim 37, wherein the wireless device further is configured to receive the first indication only when at least one of the WLAN node and the wireless device is configured to support aggregation.

44. The wireless device of claim 37, wherein the wireless device further is configured to receive the first indication in a broadcast signal wherein the first indication is comprised in one of:
an information element of a management frame, the management frame being one of a beacon frame, a probe response frame, an association response frame and a reassociation response frame; and
an information element of one of an action frame and a control frame.

45. The wireless device of claim 35, wherein the wireless device further is configured to receive the first indication in a unicast signal.

46. The wireless device of claim 45, wherein the unicast signal is a dedicated 802.11 signal, wherein the first indication is comprised in one of:
an information element of a management frame, the management frame being one of a probe response frame, an association response frame and a reassociation response; and
an information element of one of an action frame and a control frame.

47. The wireless device of claim 46, wherein the unicast signal is an Access Network Query Protocol, ANQP, signal, wherein the first indication is comprised in an information element of a Generic Advertisement Service, GAS, Initial response frame.

48. The wireless device of claim 46, wherein the first indication is one of:
an explicit indication based on a presence of one of a parameter and information in the transmitted signalling; and
an implicit indication based on an absence of one of a parameter and information in the transmitted signaling.

* * * * *